A. B. BROWN.
RAIL JOINT.
APPLICATION FILED SEPT. 13, 1916.

1,227,742.

Patented May 29, 1917.

INVENTOR.
A. B. BROWN.
BY HIS ATTORNEY:
A. M. Carlsen.

UNITED STATES PATENT OFFICE.

ALLEN B. BROWN, OF PORTLAND, OREGON.

RAIL-JOINT.

1,227,742. Specification of Letters Patent. Patented May 29, 1917.

Application filed September 13, 1916. Serial No. 120,531.

*To all whom it may concern:*

Be it known that I, ALLEN B. BROWN, a citizen of the United States, residing at Portland, in the county of Multnomah and State of Oregon, have invented a new and useful Rail-Joint, of which the following is a specification.

My invention relates to improvements in railway rail joints, and the object is to provide means for so securing the ends of rails together that they can not possibly escape laterally from their linear position to each other, and at the same time to leave the rails freedom to expand and contract. A further object is to make such rail joint easily adjustable in lateral direction without disturbing any of the spikes.

Figure 1:
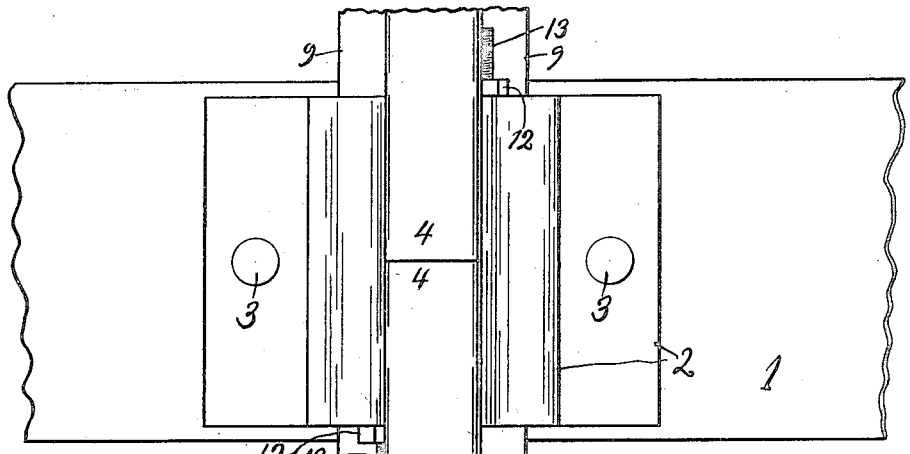
Figures 2, 4, 7:
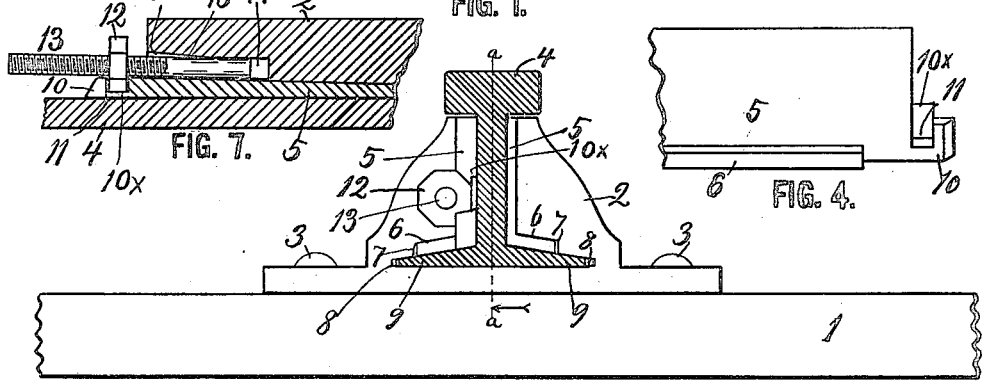
Figures 3, 5, 6:
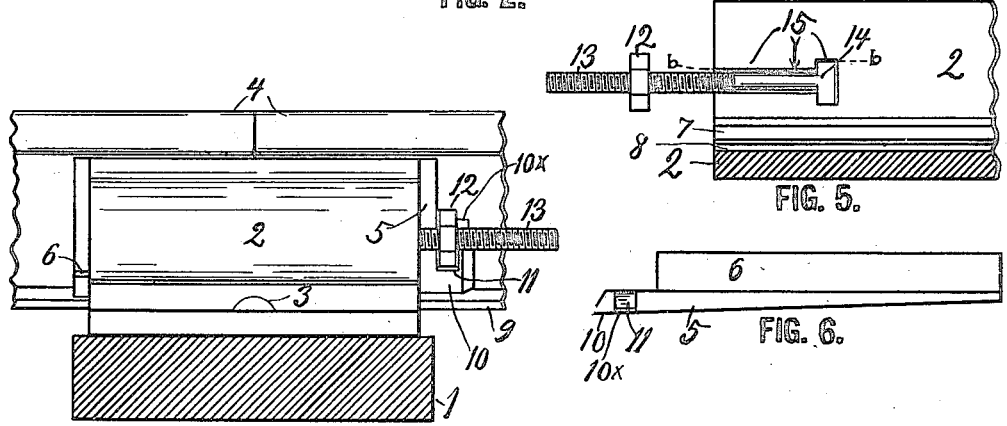

In the accompanying drawing, Figure 1 is a top view of a rail joint embodying my improvements. Fig. 2 is an elevation of either end of the rail joint in Fig. 1 with adjacent parts. Fig. 3 is a side elevation of either right or left side of Fig. 1 or 2. Fig. 4 is a detail elevation of the outer side of one of the fish-plates. Fig. 5 is a longitudinal section of the rail socket only, on the line $a$—$a$ Fig. 2, showing how the bolts 13 are held in the socket. Fig. 6 is a top view of one of the fish-plates. Fig. 7 is a horizontal section on the line $b$—$b$ in Fig. 5.

Referring to the drawing by reference numerals, 1 designates a railway tie upon which a metallic socket 2 is secured by spikes 3. The adjacent rail ends 4 are placed loosely in said socket and then secured tightly therein by two oppositely directed wedge shaped fish-plates 5, one at each side of the rail. Said plates are each formed with a lateral parallel base rib 6, guided in a groove 7 in the socket, adjacent the groove 8, which the base flange 9 occupies and may be moved some in lateral direction therein. Each fish-plate is provided at its thick end with an extension 10 having a notch 11, in which engages a nut 12 of a bolt 13. Said bolt has its head 14 preferably cut away at its inner and outer sides (see Figs. 5 and 7) and has the portion near its head and the remaining two sides of its head placed in a recess 15, which recess is widened somewhat near its open end, as at 16 in Fig. 7, so as to give the bolt some chance to spring outward when the corners of the nut 12 pass the face of a web $10^x$ of the fish plate. When each corner of the nut has passed said web the bolt springs back to normal position whereby the peripheral faces of the nut are held against the said web and the nut thereby locked against accidental rotation.

In the use or application of the invention the wedge-shaped fish-plates are by the nuts 12 forced tightly in place one at each side of the rail. Should wear and shaking of the rail make the joint loose, all slack may be taken up by simply turning the nuts 12 against the thick end of the fish plate. And if the rail by frost or heat or other cause should be displaced in or out on the tie, it can be adjusted by adjusting one fish plate forward and the other rearward by turning of the nuts 12.

The socket may also be used intermediate the ends of a rail so as to make the entire rail adjustable to and from its mate.

What I claim is—

1. A socket and means for securing it upon a railway tie, said socket having a gap in which to receive adjacent ends of two rails and in each side of the gap a recess, a bolt having its head end fitted in said recess and its other end extended beyond the socket and provided with a nut, a wedge-shaped fish-plate arranged at each side in the socket and adapted to fill between the web of the rail and the bolt so as to keep the bolt in the recess and to bear against the recessed face of the socket, said fish-plate having its thickest end provided with an extension in which there is a notch for the nut on the bolt to engage in.

2. A socket and means for securing it upon a railway tie, said socket having a gap in which to receive adjacent ends of two rails and in each side of the gap a recess, a bolt having its head end fitted in said recess and its other end extended beyond the socket and provided with a nut, a wedge-shaped fish-plate arranged at each side in the socket and adapted to fill between the web of the rail and the bolt so as to keep the bolt in the recess and to bear against the recessed face of the socket, said fish-plate having its thickest end provided with an extension in which there is a notch for the nut on the bolt to engage in, said socket having in each side at the base of the gap a lateral recess and each fish-plate having a lateral rib engaging in said recesses.

3. A socket and means for securing it upon a railway tie, said socket having a gap in which to receive adjacent ends of two rails and in each side of the gap a recess, a bolt having its head end fitted in said recess and its other end extended beyond the socket and provided with a nut, a wedge shaped fish-plate arranged at each side in the socket and adapted to fill between the web of the rail and the bolt so as to keep the bolt in the recess and to bear against the recessed face of the socket, said fish plate having its thickest end provided with an extension in which there is a notch for the nut on the bolt to engage and a web adjacent the nut, said bolt being so arranged as to spring its nut into contact with the side of the web and thereby prevent accidental rotation of the nut.

In testimony whereof I affix my signature.

ALLEN B. BROWN.